United States Patent
Pavia et al.

(10) Patent No.: US 11,685,676 B2
(45) Date of Patent: *Jun. 27, 2023

(54) PRETREATMENT OF PRODUCED WATER TO FACILITATE IMPROVED METAL EXTRACTION

(71) Applicant: Katz Water Tech, LLC, Houston, TX (US)

(72) Inventors: Michael R. Pavia, Houston, TX (US); Priyanka Karicherla, Sugarland, TX (US); Yinghui Li, Sugarland, TX (US); Gary Katz, Houston, TX (US)

(73) Assignee: Katz Water Tech, LLC, Houston, TX (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/224,118

(22) Filed: Apr. 6, 2021

(65) Prior Publication Data

US 2021/0284555 A1    Sep. 16, 2021

Related U.S. Application Data

(63) Continuation of application No. 16/030,851, filed on Jul. 9, 2018, now Pat. No. 10,968,126.

(Continued)

(51) Int. Cl.
*C02F 9/00* (2023.01)
*C02F 3/12* (2023.01)
(Continued)

(52) U.S. Cl.
CPC ............ *C02F 3/1215* (2013.01); *C02F 1/001* (2013.01); *C02F 1/74* (2013.01); *C02F 9/00* (2013.01);
(Continued)

(58) Field of Classification Search
None
See application file for complete search history.

(56) References Cited

U.S. PATENT DOCUMENTS

| | | |
|---|---|---|
| 3,931,007 A | 1/1976 | Sugano |
| 4,033,763 A | 7/1977 | Markels |

(Continued)

FOREIGN PATENT DOCUMENTS

| | | |
|---|---|---|
| CN | 106517578 B | 12/2019 |
| EP | 0150626 A2 | 8/1985 |

(Continued)

OTHER PUBLICATIONS

Odegaard, H., et al., "High Rate Biological/Chemical Treatment Based on the Moving Bed Biofilm Process Combined with Coagulation", Norwegian University of Science and technology, N-7491 Trondheim, NTSU, Norway, hallvard.odegaard@bygg.ntnu.no, pp. 1-11.

(Continued)

*Primary Examiner* — Chester T Barry
(74) *Attorney, Agent, or Firm* — Gary P. Katz; Katz Law Group, LLC (57) ABSTRACT

A water treatment system that removes calcium and magnesium using coagulants and pH controls, aqueous phase organic materials from water using a biological removal system that includes microorganisms and a physical separation system that includes sparging equipment for sparging the water to remove non-aqueous phase liquid organic materials, volatile phase organic materials. An apparatus, system and method for pretreating oilfield produced water to completely remove or significantly reduce concentrations of substances that are known to interfere with downstream recovery of metals including lithium. This technology facili- (Continued)

tates a more efficient and cost-effective extraction method from alternate sources to meet the increasing global demand.

20 Claims, 6 Drawing Sheets

Related U.S. Application Data (60) Provisional application No. 62/529,950, filed on Jul. 7, 2017.

(51) Int. Cl.

| | |
|---|---|
| *C02F 1/00* | (2023.01) |
| *C02F 1/74* | (2023.01) |
| *C02F 1/66* | (2023.01) |
| *C02F 101/20* | (2006.01) |
| *C02F 3/30* | (2023.01) |
| *C02F 3/34* | (2023.01) |
| *C02F 101/30* | (2006.01) |
| *C02F 1/52* | (2023.01) |
| *C02F 3/28* | (2023.01) |
| *C02F 3/10* | (2023.01) |
| *C02F 1/24* | (2023.01) |
| *C02F 1/20* | (2023.01) |
| *C02F 3/08* | (2023.01) |

(52) U.S. Cl.
CPC .................... *C02F 1/20* (2013.01); *C02F 1/24* (2013.01); *C02F 1/52* (2013.01); *C02F 1/5245* (2013.01); *C02F 1/66* (2013.01); *C02F 3/085* (2013.01); *C02F 3/106* (2013.01); *C02F 3/107* (2013.01); *C02F 3/108* (2013.01); *C02F 3/2806* (2013.01); *C02F 3/301* (2013.01); *C02F 3/341* (2013.01); *C02F 2101/20* (2013.01); *C02F 2101/30* (2013.01); *C02F 2101/303* (2013.01); *C02F 2301/08* (2013.01); *C02F 2305/06* (2013.01)

(56) References Cited

U.S. PATENT DOCUMENTS

| | | | |
|---|---|---|---|
| 4,069,147 | A | 1/1978 | Abrams |
| 4,432,880 | A | 2/1984 | Talbot |
| 5,397,500 | A | 3/1995 | Lee |
| 5,458,779 | A | 10/1995 | Odegaard |
| 5,451,327 | A | 12/1995 | Straten |
| 5,505,857 | A | 4/1996 | Misra |
| 5,762,807 | A | 6/1998 | Straten |
| 6,123,854 | A | 9/2000 | Iwane |
| 6,391,202 | B1 | 5/2002 | Knoblock |
| 7,914,676 | B2 | 3/2011 | Riebensahm |
| 8,216,471 | B2 | 7/2012 | Ren |
| 8,551,341 | B2 | 10/2013 | Conner |
| 8,968,572 | B2 | 3/2015 | Riebensahm |
| 9,105,372 | B2 | 8/2015 | Gane |
| 10,160,671 | B2 | 12/2018 | Eda |
| 10,968,126 | B2 * | 4/2021 | Pavia ............ C02F 1/001 |
| 2009/0130704 | A1 | 5/2009 | Gyure |
| 2013/0161200 | A1 | 6/2013 | Iwamoto |
| 2013/0199997 | A1 | 8/2013 | Werker |
| 2014/0332465 | A1 | 11/2014 | Kitagawa |
| 2016/0214876 | A1 | 7/2016 | Clement |
| 2017/0144905 | A1 | 5/2017 | Whiting |

FOREIGN PATENT DOCUMENTS

| | | |
|---|---|---|
| EP | 0349671 B1 | 1/1996 |
| GB | 1553058 A | 9/1979 |
| WO | WO2012040943 A1 | 4/2012 |
| WO | WO2016128707 A1 | 8/2016 |
| WO | WO2016188387 A1 | 12/2016 |

OTHER PUBLICATIONS

Camper, Ian P. et al., "Improvement of an Industrial Wastewater Treatment System at a Former Viscose Rayon Plant-Results From Two-Stage Biological Leachate Treatability Testing", Water Environment Foundation, 2006, pp. 1830-1845.
Odegaard, H., "The Moving Bed Biofilm Reactor", Water Environmental Engineering and Reuse of Water, Hokkaido Press 1999, 12 pages.
Dong, Z., et al., "Treatment of Oilfield Wastewater in Moving Bed Biofilm Reactors Using a Novel Suspended Ceramic Buicarrier", Journal of Hazardous Materials, v. 196, 2011, pp. 123-130.
Odegaard, H., et al., State of the Art in Europe Of the Moving Bed Biofilm Reactor (MBBR) Process, Water Environmental Federation, 2004, 17 Pages.
Biswas, K., et al., "Successional Development of Biofilms in Moving bed Biofilm Reactor (MBBR) Systems Treating Municipal Wastewater", Appl Microbial Biotechnol, 2014, vol. 98 pp. 1429-1440.
Cabral, C., "Lessons Learned On Long-Term Operation of MBBR for Refinery Wastewater Treatment", Water Environmental Federation, 2009, pp. 2479-2494.
Langone, et al., "Coexistence of Nitrifying, Anammox and Denitryifying Bacteria in a Sequencing Batch Reactor". Frontiers in Microbiology, Feb. 4, 2014, vol. 5, Article 28, pp. 1-12. (Year: 2014).
Chipasa, K., "Accumulation and Fate of Selected Heavy Metals in a Biological Wastewater Treatment System", Waste Management, 23 (2003) pp. 135-143.
Sorme, L., et al., "Capacity to Influence Sources of Heavy Metals to Wastewater Treatment Sludge", Environmental Management, vol. 31, No. 3, pp. 421-428.
Zhou, Y., et al., "Determining Discharge Characteristics and Limits of Heavy Metals and Metalloids for Wastewater Treatment Plants (WWTPs) in China Based on Statistical Methods", Sep. 14, 2018, Water 2018, 10, 1248, 17 pages.
Ying, X., et al., "Experimental Research on Heavy Metal Wastewater Treatment with Dipropyl Dithiophosphate", Journal of Hazardous Materials B137 (2006) 1636 -1642.
Kuan, Y., et al., "Heavy Metal Extraction from PCB Wastewater Treatment Sludge by Sulfuric Acid", Journal of Hazardous Materials 177 (2010) 881-886.
Da Silva Oliveira, A., et al., "Heavy Metals in Untreated/Treated Urban Effluent and Sludge from a Biological Wastewater Treatment Plant" Env. Sci. Pollut. Res. 14 (7) (2007) 483-489.
Karvelas, Michalis, et al., "Occurrence and Fate of Heavy Metals in the Wastewater Treatment Process", Chemosphere 53 (2003) 1201-1210.
Bai, S., et al., "Speciation of Heavy Metals in Biosolids of Wastewater Treatment Plants at Mysore, Karnataka, India", Environ Monit Assess (2012) 184:239-249.

\* cited by examiner

PRETREATMENT OF PRODUCED WATER TO FACILITATE IMPROVED METAL EXTRACTION

CROSS REFERENCE TO RELATED APPLICATION

This non-provisional patent application claims priority to co-pending U.S. non-provisional application Ser. No. 16/030,851, titled, "PRETREATMENT OF PRODUCED WATER TO FACILITATE IMPROVED METAL EXTRACTION", filed on Jul. 9, 2018, which has issued as U.S. Pat. No. 10,968,126 on Apr. 6, 2021. U.S. non-provisional application Ser. No. 16/030,851 claimed priority to U.S. patent provisional application having the Ser. No. 62/529,950, filed Jul. 7, 2017 with the entire disclosure hereby incorporated by reference.

TECHNICAL FIELD

The present disclosure generally relates to the field of water treatment. More specifically, the present disclosure relates to the field of oil field water remediation. Most specifically, the present disclosure relates to the field of produced water pre-treatment to facilitate improved metal recovery such as, lithium.

BACKGROUND

In various types of crude oil recovery operations, oil and other organic materials may contaminate water that has been used in the oil recovery operations or contaminate water that is in the surroundings of the location of the oil recovery operations. The water contaminants often include petroleum hydrocarbons, oilfield chemicals, various types of salts, suspended solids etc. While water contamination in oil recovery operations is commonplace, water discharged from those operations often needs to meet stringent environmental standards. In particular, water discharged into the sea needs to meet certain minimum environmental standards. Because of the environmental standards, technologists have developed water treatment systems and processes for removing contaminants such as petroleum hydrocarbons and other organic materials from water.

Over time, different treatment systems that are applicable to different types of materials have been developed. For example, it is known that physical separation methods are commonly used to separate particulates/colloids from water. On the other hand, it is known that biological water treatment methods are used for the removal of soluble organic materials from water. The different types of methods are known to be implemented in series—one after the other. The biological water treatment is often implemented in bioreactors that use biofilm carriers. The conventional practice is to implement a physical separation process to remove oil and grease (free oil and grease) from the water prior to the biological water treatment process to remove soluble organic materials from the water. Water treatment systems that remove oil and grease from water by a physical water treatment process and then treat the water in a biological process are labor intensive and difficult to operate.

In an environment of increasingly stricter environmental standards, especially with the onset of hydraulic fracturing as a widely used oil recovery method and the continued development of microbial enhanced oil recovery (both of which use significant amounts of water), more effective water treatment processes are always desired.

The rising need for lithium for its extensive application in rechargeable batteries to power electronics and automobiles is well documented in the art. See Meshram, Pratima, B. d. Pandey, and T. r. Mankhand. "Extraction of lithium from primary and secondary sources by pre-treatment, leaching and separation: A comprehensive review." Hydrometallurgy 150 (2014): 192-208, the disclosure of which is incorporated herein by reference. Traditionally, technologies for lithium extraction involve solvent extraction from minerals and concentration from salt-lake deposits through evaporation, however, limited resources, long processing times and elevated costs pose a substantial challenge to meet its ever-increasing global demand. See Mohr, Steve H., Gavinm. Mudd, and Damien Giurco. "Lithium Resources and Production: Critical Assessment and Global Projections." Minerals 2.4 (2012): 65-84, the disclosure of which is incorporated herein by reference.

More recent, alternative sources for lithium include recovery from produced water that is readily available as a byproduct of oil field operations. See McEachern, Preston, MGX Minerals 2017, Report, "Lithium Recovery from Oilfield Produced Water Brine & Wastewater Treatment" the disclosure of which is incorporated herein by reference. The success and economic feasibility of lithium extraction from these sources using available techniques is highly dependent on initial processing of the water to remove emulsified oil, hydrogen sulfide, divalent cations and total organic carbon content.

BRIEF SUMMARY

The present disclosure is directed to systems and methods for treating contaminated water wherein the contaminated water is subjected to dissolved gas flocculation and then concurrently subjected to a physical water treatment process and a biological water treatment process. Applying both water treatment processes to contaminated water, at the same time, concurrently removes different types of organic material contaminants. The organic materials (e.g. organic compounds, hydrocarbons) may include materials such as aqueous phase organic materials, non-aqueous phase liquid organic materials and volatile phase organic materials. According to embodiments of the disclosure, one or more mechanisms that implement the biological water treatment process may be used, at the same time, to implement the physical water treatment process.

Embodiments of the invention include a water treatment method that involves subjecting the water to dissolved gas flocculation and then concurrently subjecting water to a biological water treatment process that removes a first set of organic materials from the water (e.g. aqueous phase organic materials) and a physical water treatment process that removes a second set of organic materials from the water (e.g. non-aqueous phase liquid organic materials and volatile phase organic materials).

Embodiments of the invention also include a water treatment system having a gas floatation bioreactor vessel adapted to undergo dissolved gas flocculation and then concurrently remove organic materials from water by a biological water treatment process and a physical separation process. The gas floatation bioreactor vessel includes a biological removal system having microorganisms for removing a first set of organic materials (e.g. aqueous phase organic materials) from the water and a physical separation system including sparging equipment for removing a second set of organic materials (e.g. non-aqueous phase liquid organic materials and volatile phase organic materials) from the water.

In one embodiment, the present invention relates to an apparatus, system and methods for the design of a two-step process, involving the application of a dissolved air flotation unit in combination with a moving bed biofilm reactor to pre-treat produced water fluids to remove substances that are known to interfere with extraction of metals such as, lithium. This type of pre-processing of produced water allows for more efficient and cost effective downstream recovery of metals including lithium.

BRIEF DESCRIPTION OF THE DRAWINGS

For a more complete understanding of the disclosed methods and apparatuses, reference should be made to the embodiments illustrated in greater detail in the accompanying drawings, wherein.

The drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to any specific embodiment illustrated herein.

DETAILED DESCRIPTION

Below is a description of various embodiments of the invention. Before describing selected embodiments of the present disclosure in detail, it is to be understood that the present invention is not limited to any specific embodiment described herein. The disclosure and description herein are illustrative and explanatory of one or more presently preferred embodiments and variations thereof. It will be appreciated by those skilled in the art that various changes in the design, organization, means of operation, structures and location, methodology, and use of mechanical equivalents may be made without departing from the spirit of the invention.

The drawings are intended to illustrate and plainly disclose presently preferred embodiments to one of skill in the art. The drawings are not intended to be manufacturing level drawings or renditions of final products. These may include simplified conceptual views to facilitate understanding or explanation. In addition, the relative size and arrangement of the components may differ from that shown and still operate within the spirit of the invention.

Moreover, various directions such as "upper", "lower", "bottom", "top", "left", "right", "first", "second" and so forth are made only with respect to explanation in conjunction with the drawings. The inventive components may be oriented differently, for instance, during transportation, manufacturing and operations. Numerous varying and different embodiments and modifications may be made within the scope of the concept(s) embodiments herein taught and described. Therefore, it is to be understood that the details herein are to be interpreted as illustrative and non-limiting. For example, many embodiments and examples are used to describe treating produced water. However, the invention can be used to handle any type of wastewater.

Figure 1:
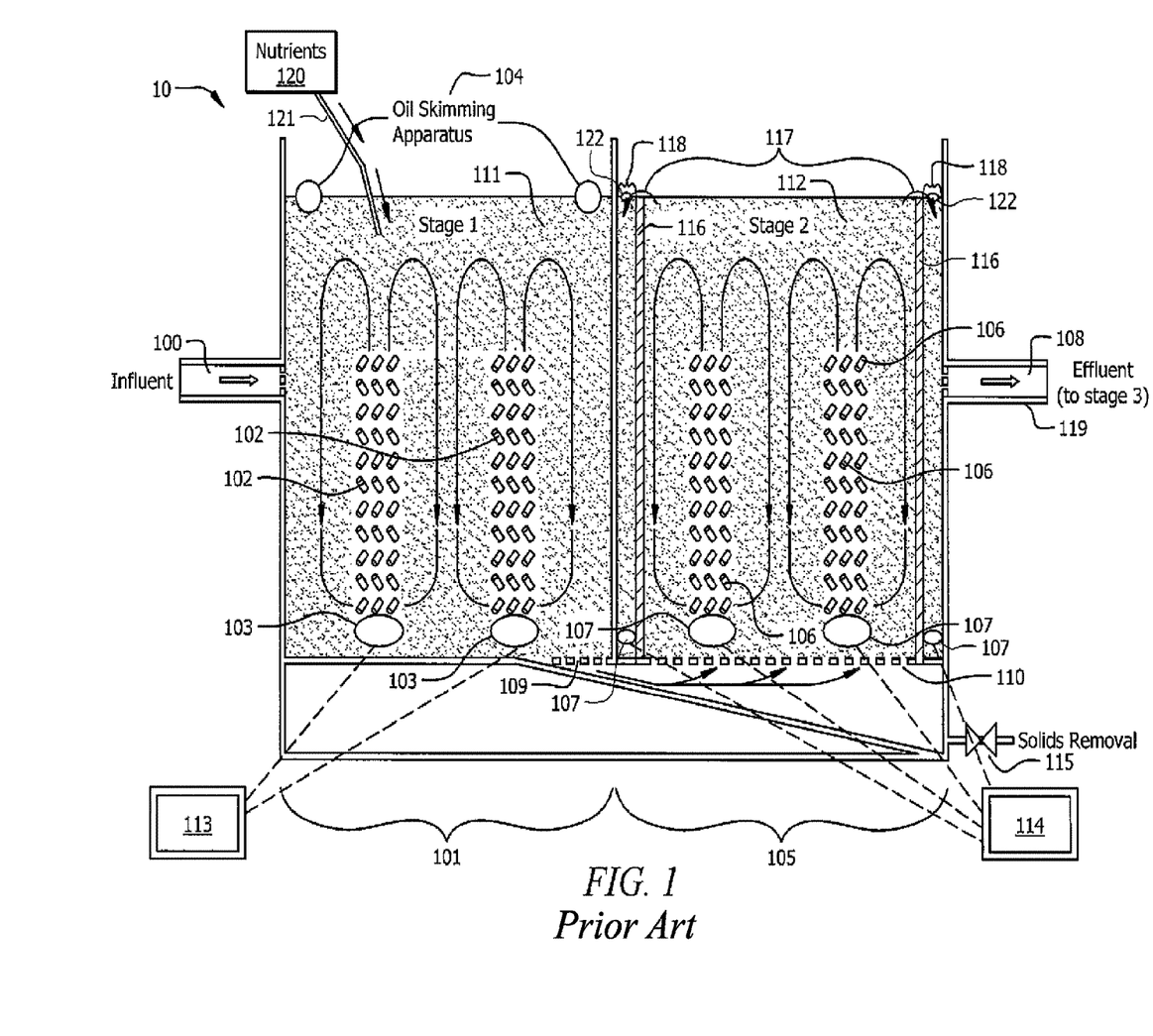
FIG. 1 illustrates a prior art water treatment system.
Figure 2:
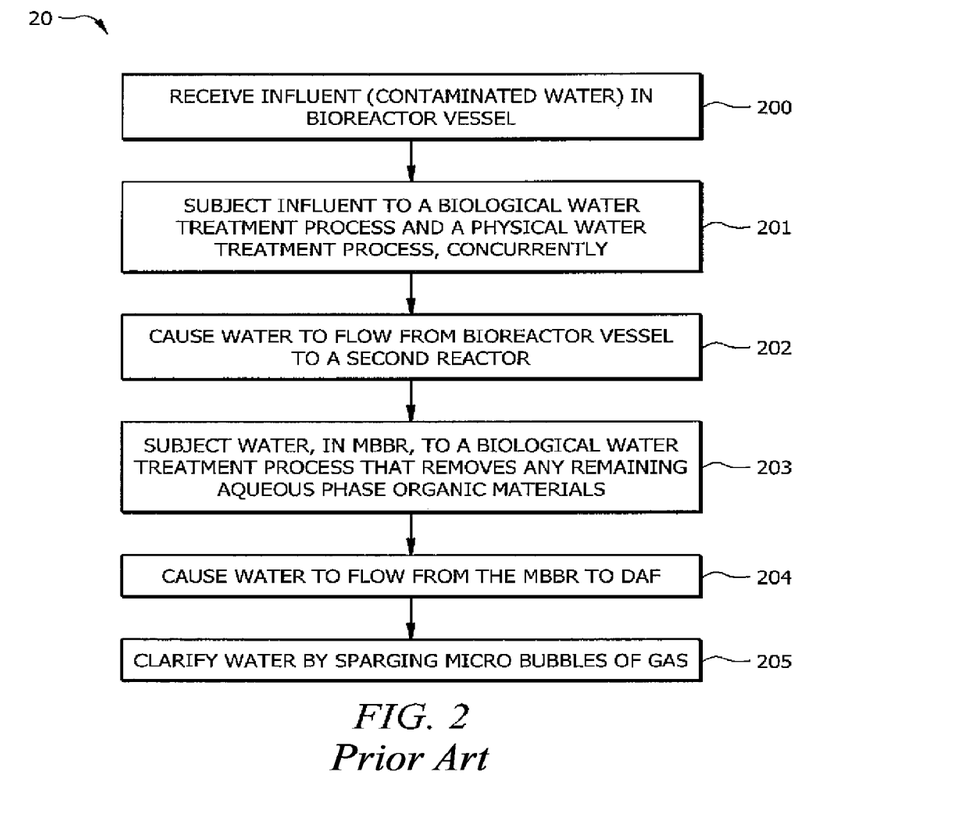
FIG. 2 illustrates a prior art process a process for treating water.

FIG. 1 shows water treatment system 10 for treating water, such as wastewater. Wastewater may include water contaminated by materials such as petroleum hydrocarbons, oilfield chemicals, various types of salts, suspended solids etc. Water treatment system 10 treats water to simultaneously remove aqueous phase organic materials, non-aqueous phase liquid organic materials and volatile phase organic materials. FIG. 2 shows water treatment method 20. Water treatment system 10 may be used to implement water treatment method 20 according to embodiments of the invention to treat water to meet one or more standards (e.g. environmental standards) established by a standards organization, government entity, company, etc.). Water treatment method 20 may begin, at block 200, with water treatment system 10 receiving influent 100 in gas floatation bioreactor vessel 101. Influent 100 may be a contaminated water stream containing any combination of materials such as one or more salts, free oil, aqueous phase organic materials (e.g. dissolved organic materials such as organic acids and alcohols), slightly dissolved non-aqueous phase liquid organic materials, and non-aqueous phase liquid organic materials (e.g. non-polar organic materials). Thus, influent 100 may have a broad spectrum of organic materials mixed with the water.

According to embodiments of the invention, after gas floatation bioreactor vessel 101 receives influent 100 (referred to as water 111 in gas floatation bioreactor vessel 101) at block 200, water treatment method 20 progresses, at block 201, into a first major stage in which water treatment system 10 simultaneously removes aqueous phase organic materials, non-aqueous phase liquid organic materials and volatile phase organic materials. The first major stage involves concurrently subjecting water 111, in gas floatation bioreactor vessel 101, to both of: (i) a biological water treatment process that removes the aqueous phase organic materials from water 111 and (ii) a physical water treatment process that removes non-aqueous phase liquid organic materials and volatile phase organic materials from water 111.

To implement the biological water treatment process, gas floatation bioreactor vessel 101 may have several biological carriers 102 circulating in it. Microorganisms colonize biological carriers 102. In other words, a biofilm forms on biological carriers 102. Essentially, biological carriers 102 act as a substrate on which microorganisms (a biomass) grows.

Figure 3:
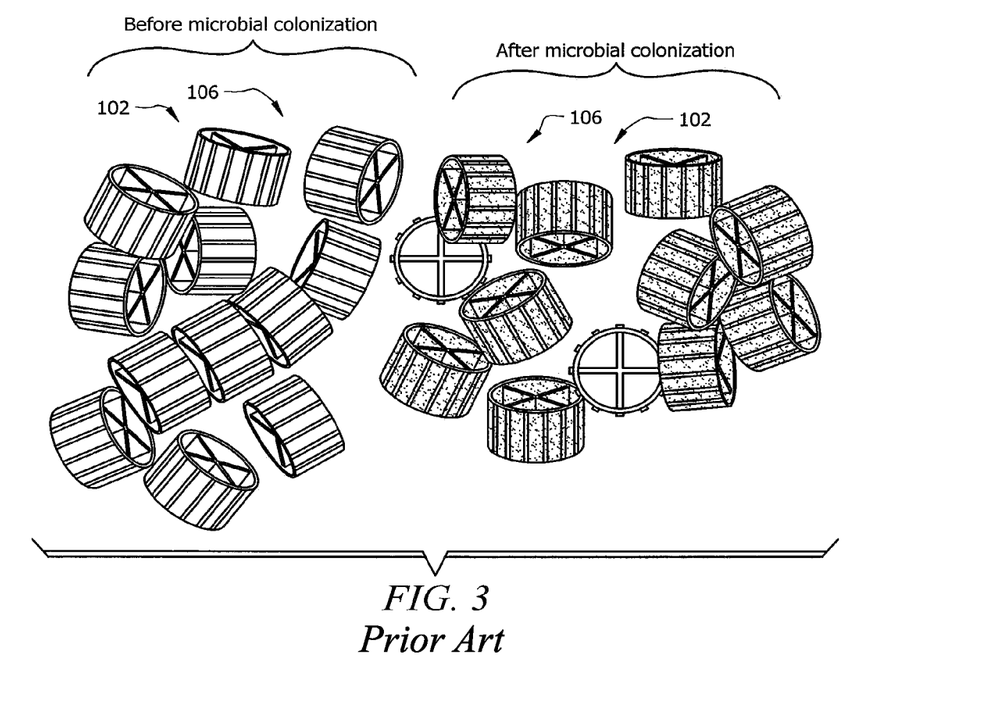
FIG. 3 illustrates prior art carriers used in the implementation of water treatment.

Biological carriers 102 may be made from polyethylene, polyurethane, plastic, granular activated carbon, sand, ceramic, limestone, graystone, slag, and combinations thereof. In embodiments, biological carriers 102 may float or partially float in water. Biological carriers 102 provide a large surface area for the microorganisms to live, grow, and degrade particular organic materials. To provide a large surface area, biological carriers 102 may be made with a basic cylindrical structure with additional structure (fins) within and on the outside of the cylindrical structure to provide additional surface area. FIG. 3 shows carriers used in the implementation of embodiments of the invention before microbial colonization and after microbial colonization of biological carriers 102 (and 106). The biological carriers shown in FIG. 3 may have a diameter of about 0.9-3 cm and height 0.4-1 cm.

The growth of biomass on biological carriers 102 may be allowed to occur naturally or particular microorganisms may be introduced in gas floatation bioreactor vessel 101 to colonize and form an initial biofilm on biological carriers 102. Methods for the establishment, development, and growth of biofilms are disclosed in "*Successional development of biofilms in moving bed biofilm reactor (MBBR) systems treating municipal wastewater*," ENVIRONMENTAL BIOTECHNOLOGY, published online 10 Jul. 2013, the disclosure of which is incorporated herein by reference.

In embodiments of the invention, a gas flowing through water 111 circulates biological carriers 102 within water 111, as shown in FIG. 1. The gas may include natural air, nitrogen-enriched air, oxygen, argon, and combinations thereof. Gas supply equipment 113 may be a gas pump (blower), a compressor, a compressor pressurized tank etc. for supplying the gas so that it flows to gas floatation bioreactor vessel 101 via gas injection bars 103. As the gas flows in water 111, it circulates biological carriers 102, and, thereby, circulates the microorganisms on biological carriers 102. Thus, the flow of gas causes the microorganisms to circulate and in contact with a large volume of water. In this way, the microorganisms are constantly being exposed to the organic materials in water 111. Thus, the microorganisms can consume or degrade organic materials such as aqueous phase organic materials and thereby remove such aqueous phase organic materials from water 111 in a biodegradation process.

According to embodiments of the invention, the flow of gas from gas injection bars 103 circulates microbe laden biological carriers 102 and thereby facilitates the biological water treatment process that biodegrades and removes aqueous phase organic materials. At the same time, the gas flowing from gas injection bars 103 facilitates the physical separation of non-aqueous phase liquid organic materials and volatile phase organic materials from water 111.

The biological degradation process and the physical separation process both involve several mechanisms that occur concurrently because of the gas being sparged (bubbled) through water 111. First, as mentioned earlier, bubbling of the gas through water 111 circulates biological carriers 102 in water 111 and thereby facilitates the exposure of microorganisms on biological carriers 102 to aqueous phase organic materials. Second, for embodiments that involve aerobic systems, the gas may include oxygen and that oxygen is delivered to the microorganisms that are growing on biological carriers 102. The aerobic microorganisms absorb and consume the oxygen in biochemical processes. Third, the bubbling of the gas through water 111 facilitates the evaporation of volatile phase organic materials (vapor stripping). In embodiments of the invention, gas floatation bioreactor vessel 101 may be closed so that such volatile organic materials that have been evaporated from water 111 may be stripped away from the head space above water 111 in gas floatation bioreactor vessel 101. Fourth, the bubbling of the gas through water 111 at a rate (e.g. a volume as a function of time) creates gas bubbles that cause at least some of the second set of organic materials, such as non-aqueous phase liquid organic materials, to coalesce, separate from water 111, and float atop water 111. Oil skimming apparatus (oil skimmer) 104 may then remove non-aqueous phase liquid organic materials. In embodiments of the invention, a determination is made as to the properties of the gas flow through water 111 that provides oxygen to the microorganisms at a pre-established rate, provides separation of non-aqueous phase liquid organic materials at a pre-established and vaporization of volatile phase organic materials at a pre-established rate.

In embodiments of the invention, the biological water treatment process may be unable to remove non-aqueous phase liquid organic materials and the volatile phase organic materials. Also, in embodiments of the invention, the physical water treatment process may be unable to remove the aqueous phase organic materials.

In embodiments of the invention, implementing water treatment method 20 using water treatment system 10 causes a microbial degradation process of both water phase organic materials and non-aqueous (oil phase) organic materials. And, at the same time, the physical water treatment process (sparging gas (bubbling gas) through water 111 via gas injection bars 103) drives organic materials, such as oil, up to the surface of water 111 where the oil coalesces, is skimmed, and removed from the reactor by oil skimming apparatus 104.

The biological water treatment process may involve: (i) introducing particular microorganisms to colonize biological carriers 102, (ii) introducing the appropriate amount and type of nutrients (e.g. amount of nitrogen and phosphorus) for the microorganisms and for the biological degradation desired (e.g. based on the type of organic materials to be degraded), (iii) maintaining the right temperature for the microorganisms to thrive, (iv) providing an appropriate amount of oxygen, and (v) combinations thereof. In embodiments of the invention, nutrient injector 121 may inject the appropriate nutrients from nutrient storage 120 into gas floatation bioreactor vessel 101. Once the right environment for growth of the microorganisms (microbes) have been established, and the appropriate flow rate of gas and gas bubble size is determined and provided, the removal of different types of organic materials from water 111 occurs at the same time.

Removing different types of organic materials—such as non-aqueous phase liquid organic materials (non-polar organic materials), vapor-phase organic materials, and aqueous phase organic materials—at the same time—provides for an efficient use of resources. Resources such as time, capital, and materials used in the water treatment process are more efficiently used in embodiments of the invention. For example, the systems and processes according to embodiments of the invention save time by providing a way to implement the biological water treatment process and the physical water treatment process concurrently instead of consecutively. In this way, water treatment method 20, for example, eliminates the time for either the biological or the physical water treatment process (i.e. the time for the shortest of the biological or the physical water treatment process may be eliminated). Indeed, to the extent that any organic materials in water 111 may be affected by both the biological water treatment process and the physical water treatment process, the systems and processes according to embodiments of the invention would be more effective than a system that has separate biological removal and physical removal processes. Thus, embodiments of the invention may include concurrently applying a biological water treatment process and a physical water treatment process to remove specified organic material that can be removed by both processes.

Further, the systems and processes according to embodiments of the invention reduce the amount of capital required to invest in water treatment processes. For example, instead of requiring a first reactor vessel for the biological removal process and a second vessel for the physical removal process, embodiments of the invention use one vessel to implement both the biological water treatment process and the physical water treatment process.

Embodiments according to the invention also reduce the amount of material, such as gas, needed for the water treatment process. In a system with separate biological and physical water treatment processes, separate supplies of gas would be necessary—i.e. a larger volume of gas would be required as compared with the volume required for embodiments of the present invention. Therefore, embodiments of the invention provide a more efficient water treatment system from numerous perspectives.

In particular embodiments of the invention, instead of an aerobic process in gas floatation bioreactor vessel 101, an anaerobic process is implemented. In such embodiments, the gas may be a non-oxidizing gas (an inert gas) such as nitrogen or argon. In an anaerobic system, the microorganisms used to carry out the biological water treatment process are anaerobic and do not require oxygen. Thus, there is no need to add oxygen to gas floatation bioreactor vessel 101. However, appropriate nutrients (e.g. amount of nitrogen and phosphorus) may be added to gas floatation bioreactor vessel 101 to allow anaerobic growth of the microorganisms on biological carriers 102. These embodiments utilizing anaerobic biological activity to remove organic materials are capable of safely treating influent streams that have a high percentage of flammable material because the embodiments may use an inert gas to separate flammable material from water. The flammable material collects on top of water in bioreactor reactor vessel 101 and because an inert gas is used, there is a reduced risk of igniting the flammable material as compared to separation in an aerobic bioreactor, in which oxygen or air is circulated.

In block 201 of water treatment method 20, the biological water treatment process may include the removal of aqueous phase organic materials such as alcohols, aldehydes, amides, amines, carboxylic acids, ethers, esters, ketones, nitriles, nitro compounds and phenols by activity of microorganisms (microbes) that have colonized biological carriers 102 that are circulating in water 111. As described above, the gas injected in water 111, in gas floatation bioreactor vessel 101, may comprise air or oxygen so that any aerobic microorganisms on biological carriers 102 are provided with an appropriate amount of oxygen. The aerobic microorganisms consume the oxygen and degrade the organic materials.

In embodiments of the invention, for the biological water treatment process of block 201, the microorganisms that colonize biological carriers 102 and degrade aqueous phase organic materials may include microorganisms such as heterotrophic aerobic bacteria and archaea, heterotrophic nitrate-reducing bacteria, heterotrophic anaerobic bacteria and archaea, aerobic and anaerobic fungi, and combinations thereof.

In embodiments of the invention, the physical water treatment process of block 201 may include sparging a gas through water 111 and skimming non-aqueous phase liquid organic materials such as hydrocarbons with more than seven carbon atoms, aromatic compounds, asphaltenes, other components of underground hydrocarbon reservoirs, and combinations thereof from a surface of water 111. As noted above, the gas may be air, nitrogen enriched air, argon, and combinations thereof. In embodiments of the invention, sparging the gas through water 111 in gas floatation bioreactor vessel 101 provides enough oxygen to the microbes to stimulate aerobic microbial growth but not enough oxygen to cause the organic materials to ignite. In embodiments of the invention, the amount of oxygen that is sufficient to stimulate aerobic microbial growth of the microbes but is not sufficient to cause organic materials to ignite is in the range 0.5-1%. At block 201, the sparging of gas through water 111 may cause volatile phase organic materials to evaporate and thereby separate from water 111. If gas floatation bioreactor vessel 101 is a closed vessel, evaporated volatile phase organic materials collects above a surface of water 111, from where it may be suctioned out of and removed from gas floatation bioreactor vessel 101. These volatile phase organic materials may include materials such as low molecular weight hydrocarbons such as butane, benzene, hexane, propane, pentane, toluene, and combinations thereof.

According to embodiments of the invention, at block 202, water 111 flows from gas floatation bioreactor vessel 101 through screen 109 to reactor 105. Screen 109—located at the bottom of gas floatation bioreactor vessel 101—allows water 111 to underflow such that water 111 flows into reactor 105 (referred to as water 112 in reactor 105 (gas floatation bioreactor vessel's effluent water)). At the same time, screen 109 prevents biological carriers 102 from flowing from gas floatation bioreactor vessel 101 to reactor 105. Aqueous phase organic materials such as petroleum or components of petroleum that are not soluble in water 111 will likely have a lower density than the density of water 111 and so the petroleum or petroleum components will tend to move up in gas floatation bioreactor vessel 101 instead of down with the flow of water 111 into reactor 105. In reactor 105, water 112 will likely still have some organic materials remaining in it that needs to be biodegraded. Reactor 105 may have an inner concentric chamber that acts as a moving bed biofilm reactor (MBBR) 117 and an outer concentric chamber acting as dissolved air floatation (DAF) unit 118. Weir 116 separates moving bed biofilm reactor 117 from dissolved air floatation unit 118.

In reactor 105, block 203 implements a second major stage of water treatment method 20. Block 203 may involve subjecting water 112, in moving bed biofilm reactor 117, to a biological water treatment process that removes any remaining aqueous phase organic materials, from water 112. Essentially, the second major stage is a "clean-up" phase to remove the remaining dissolved organic materials.

To implement the biological water treatment process, moving bed biofilm reactor 117 may have several small carriers 106 in it so that microorganisms can colonize carriers 106. Like biological carriers 102, carriers 106 may be made from polyethylene, polyurethane, plastic, granular activated carbon, sand, ceramic, limestone, graystone, slag, and combinations thereof. Gas supply equipment 114 may be a gas pump (blower), a compressor, a compressor pressurized tank etc. for supplying the gas so that it flows to reactor 105 via gas injection bars 107. As the gas flows in water 112, it circulates biological carriers 106, and, thereby, circulates the microorganisms on biological carriers 106. Thus, the flow of gas causes the microorganisms to circulate and contact with a large volume of water. In this way, the microorganisms are constantly being exposed to the organic materials in water 112. Thus, the microorganisms consume or degrade organic materials such as aqueous phase organic materials and thereby remove such aqueous phase organic materials from water 112 in a biodegradation process. The microorganisms that are used to carry out the biological water treatment process in reactor 105 may include: heterotrophic aerobic bacteria and archaea, heterotrophic nitrate-reducing bacteria, heterotrophic anaerobic bacteria and archaea, aerobic and anaerobic fungi, and combinations thereof.

Water treatment method 20 may also include allowing water 112 to flow from moving bed biofilm reactor 117 to dissolved air floatation unit 118 over weir 116, at block 204. At block 205, a flow of microbubbles through water 112 (MBBR's effluent water, in dissolved air floatation unit 118) clarifies water 112 so that any remaining material such as particulate matter (e.g. biomass) is brought to the surface of water 112. Oil skimming apparatus 122 may be used to skim such particulate matter from the surface of water 112. Also, coagulant may be added in dissolved air floatation unit 118 to cause the particulate matter to adhere together so that they can be more easily removed.

At block 205, bio-solids that have been created because of the biological water treatment processes in gas floatation bioreactor vessel 101 and reactor 105 can flow from reactor 105 through screen 110—located at the bottom of reactor 105—through valve 115 into a solids removal system. Outlet 119 provides an avenue to discharge water 112, as effluent 108, from dissolved air floatation unit 118 of reactor 105. Outlet 119 carries effluent 108 to a filtration system that removes any remaining bio-solids. The bio-solids (biomass) removal steps may include the use of flocculants.

It should be noted that, in embodiments of the invention, the order of the steps of water treatment method 20 may vary and some steps may not be carried out. For example, depending on the components of influent 100, the second major stage may not be necessary as all the removal of organic material may be achieved in gas floatation bioreactor vessel 101.

An embodiment of the invention is a water treatment method including concurrently subjecting water, in a vessel, to a biological water treatment process that removes aqueous phase organic materials from the water using microbes circulating in the water on carriers. The method may also include a physical water treatment process that removes non-aqueous phase liquid organic materials or volatile phase organic materials from the water. The physical water treatment process may include sparging a gas through the water. The sparging of the gas causes a coalescing of the non-aqueous phase liquid organic materials so that the non-aqueous phase liquid organic materials settles on a surface of the water or the sparging of the gas causing vapor stripping of the volatile phase organic materials so that the volatile phase organic materials move to a location above the surface of the water. In the water treatment method, the gas may be selected from the list consisting of: air, nitrogen-enriched air, nitrogen, oxygen, and combinations thereof. Also, the gas may include enough oxygen to stimulate aerobic microbial growth of the microbes but not enough oxygen to cause the organic materials to ignite.

Embodiments of the invention include methods of any combination of the following methods (a)-(t) and apparatus configured to carry out any combination of the following methods (a)-(t):

(a) A water treatment method including: concurrently subjecting water that includes organic materials therein, in a first vessel, to: a biological water treatment process that removes a first set of organic materials from the water; and a physical water treatment process that removes a second set of organic materials from the water.

(b) The water treatment method of (a) in which the first vessel comprises a gas floatation bioreactor vessel.

(c) The water treatment method of (a) in which the biological water treatment process includes: removing the first set of organic materials by microorganisms, the first set of organic materials comprise aqueous phase organic materials and the microorganisms are disposed on carriers circulating in the water.

(d) The water treatment method of (c) in which the carriers include material selected from the list consisting of: polyethylene, polyurethane, plastic, granular activated carbon, sand, ceramic, limestone, graystone, slag, and combinations thereof.

(e) The water treatment method of (c) in which the microorganisms are selected from the group consisting of: heterotrophic aerobic bacteria and archaea, heterotrophic nitrate-reducing bacteria, heterotrophic anaerobic bacteria and archaea, aerobic and anaerobic fungi, and combinations thereof.

(f) The water treatment method of (c) in which the physical water treatment process comprises sparging a first gas through the water, in which the sparging of the first gas causes a coalescing of non-aqueous phase liquid organic materials of the second set of organic materials so that the non-aqueous phase liquid organic materials settles on a surface of the water, wherein the sparging of the first gas causes the circulating of the carriers and the sparging of the first gas provides oxygen to the microorganisms in the biological water treatment process, and in which the aqueous phase organic materials and the non-aqueous phase liquid organic materials are removed concurrently from the water.

(g) The water treatment method of (f) in which the physical water treatment process further comprises: skimming the non-aqueous phase liquid organic materials from a surface of the water.

(h) The water treatment method of (c) wherein the physical water treatment process comprises sparging a first gas through the water, in which the sparging of the first gas causes vapor stripping of volatile phase organic materials of the second set of organic materials so that the volatile phase organic materials move to a location above the surface of the water, in which the sparging of the first gas causes the circulating of the carriers and the sparging of the first gas provides oxygen to the microorganisms in the biological treatment process, and in which the aqueous phase organic materials and the volatile phase organic materials are removed concurrently from the water.

(i) The water treatment method of (h) in which the physical water treatment process further comprises: removing the volatile phase organic materials from above a surface of the water.

(j) The water treatment method of (i) in which the first gas comprises enough oxygen to stimulate aerobic microbial growth of the microorganisms but not enough oxygen to cause the volatile phase organic materials to ignite.

(k) The water treatment method of (a) further including: receiving, in a second vessel, after the subjecting, the first vessel's effluent water; subjecting the first vessel's effluent water, in a first portion of the second vessel, to a second biological water treatment process that removes a third set of organic materials from the first vessel's effluent water; flowing the first portion's effluent water to a second portion of the second vessel; and subjecting the first portion's effluent water, in the second portion of the second vessel, to a second physical water treatment process that removes a fourth set of organic materials from the first portion's effluent water.

(l) The water treatment method of (k) wherein the second biological water treatment process includes: removing the third set of organic materials by microorganisms disposed on carriers circulating in the water in the first portion of the second vessel.

(m) The water treatment method of (l) wherein the microorganisms are selected from the group consisting of: heterotrophic aerobic bacteria and archaea, heterotrophic nitrate-reducing bacteria, heterotrophic anaerobic bacteria and archaea, aerobic and anaerobic fungi, and combinations thereof.

(n) The water treatment method of (l) wherein the second physical separation process includes: sparging a second gas through the first portion's effluent water in the second reactor vessel.

(o) The water treatment method of (n) wherein the second gas is selected from the list consisting of: air, nitrogen-enriched air, nitrogen, oxygen, and combinations thereof.

(p) The water treatment method of (k) in which the first portion of the second vessel includes a moving bed biofilm reactor and wherein the second portion of the second vessel includes a dissolved air floatation unit.

(q) The water treatment method of (k) in which the third set of organic materials comprise aqueous phase organic materials.

(r) The water treatment method of (k) wherein the fourth set of organic materials comprise biomass.

(s) The water treatment method of (r) further including: skimming particulate matter from a surface of the first portion's effluent water in the second vessel.

(t) The water treatment method of (a) for treating water to meet one or more standards.

(u) the water treatment method of (a-z), wherein the treatment is combined with thermal evaporative or crystallization technology such as, U.S. Pat. No. 9,783,431. The entire disclosure of U.S. Pat. No. 9,783,431 is hereby incorporated by reference.

Dissolved Gas Flotation (DGF)

Dissolved air flotation (DAF) is a water treatment process that clarifies wastewaters including oil and gas produced water by the removal of suspended matter such as, oil or solids. The removal is achieved by dissolving air in the water or wastewater under pressure and then releasing the air at atmospheric pressure in a flotation tank basin. The released air forms tiny bubbles which adhere to the suspended matter causing the suspended matter to float to the surface of the water where it may then be removed by a skimming device. Dissolved air flotation is very widely used in treating the industrial wastewater effluents from oil refineries, petrochemical and chemical plants, natural gas processing plants, paper mills, general water treatment and similar industrial facilities. A very similar process known as induced gas flotation is also used for wastewater treatment. Froth flotation is commonly used in the processing of mineral ores. In the oil industry, dissolved gas flotation (DGF) units may not use air as the flotation medium due to the explosion risk. Nitrogen gas or other unreactive or no-flammable gas is typically used instead to create the micro gas bubbles and the operation is substantially the same.

Figure 4:
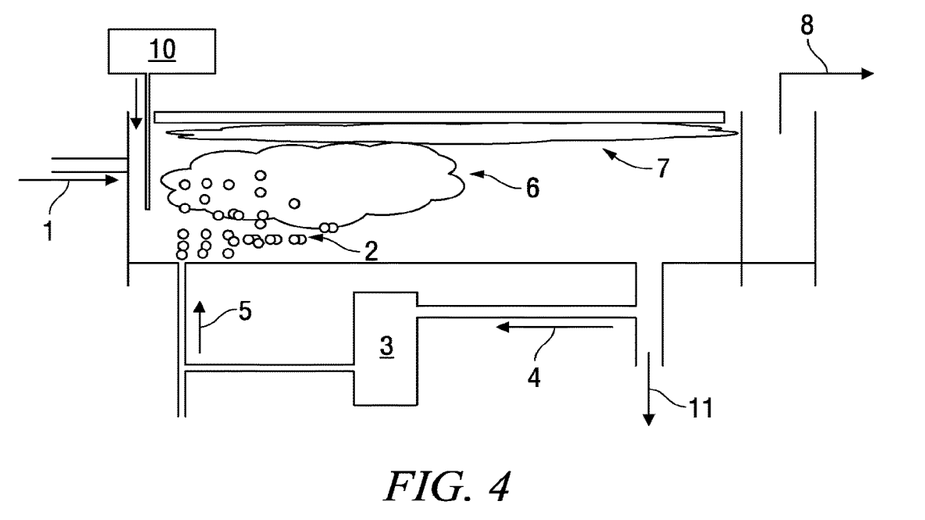
FIG. 4 is a side view of a dissolved gas flotation unit.

As shown in FIG. 4, an embodiment of the invention comprises a dissolved air flotation (DAF) unit that is the first step in the process of water treatment. The process involves flow of produced water containing contaminants 1 into the DAF that comprises of micro air bubbles 2 that are generated continually by injecting pressurized air via a compressor 3 into a side stream of the treated water 4. As this water with entrained air enters 5 into the DAF, microbubbles are generated due to the pressure change, which can then attach to and affect the buoyancy of emulsified oil droplets and total suspended solids, allowing for their rise 6 and removal at the surface via a skimming apparatus 7. Sludge that collects in the side chamber 8 is removed by directing to a sludge tank (not shown). Addition of standard coagulants and pH control 10 allow for precipitation and removal of calcium and magnesium compounds; lowering the concentrations of these interfering compounds aids in the downstream lithium recovery process. The precipitated calcium and magnesium can be removed through multiple processes including but not limited to sedimentation, mechanical filtering, and membrane filtering including reverse osmosis membrane. Treated produced water 11 is then directed to the second stage of the said process.

Coagulants and pH Controls

Coagulation or chemical precipitation is one of the more common methods used to soften water. Coagulants or chemicals normally used are lime (calcium hydroxide, $Ca(OH)_2$) and soda ash (sodium carbonate, $Na_2CO_3$). Lime is used to remove chemicals that cause carbonate hardness. Soda ash is used to remove chemicals that cause non-carbonate hardness. When lime and soda ash are added, hardness-causing minerals form nearly insoluble precipitates. Calcium hardness is precipitated as calcium carbonate ($CaCO_3$). Magnesium hardness is precipitated as magnesium hydroxide ($Mg(OH)_2$). These precipitates are then removed by conventional processes of coagulation/flocculation, sedimentation, and filtration. Because precipitates are very slightly soluble, some hardness remains in the water—usually about 50 to 85 mg/l (as $CaCO_3$). This hardness level is desirable to prevent corrosion problems associated with water being too soft and having little or no hardness.

Other commonly used metal coagulants fall into two general categories: those based on aluminum and those based on iron. The aluminum coagulants include aluminum sulfate, aluminum chloride and sodium aluminate. The iron coagulants include ferric sulfate, ferrous sulfate, ferric chloride and ferric chloride sulfate. Other chemicals used as coagulants include hydrated lime and magnesium carbonate.

The effectiveness of aluminum and iron coagulants arises principally from their ability to form multi-charged polynuclear complexes with enhanced adsorption characteristics. The nature of the complexes formed may be controlled by the pH of the system.

When metal coagulants are added to water the metal ions (Al and Fe) hydrolyze rapidly but in a somewhat uncontrolled manner, forming a series of metal hydrolysis species. The efficiency of rapid mixing, the pH, and the coagulant dosage determine which hydrolysis species is effective for treatment. This process can be synergistically combined with electrocoagulation. The coagulant can be added before, during or after electrocoagulation to achieve favorable results.

There has been considerable development of pre-hydrolyzed inorganic coagulants, based on both aluminum and iron to produce the correct hydrolysis species regardless of the process conditions during treatment. These include aluminum chlorohydrate, polyaluminum chloride, polyaluminum sulfate chloride, polyaluminum silicate chloride and forms of polyaluminum chloride with organic polymers. Iron forms include polyferric sulfate and ferric salts with polymers. There are also polymerized aluminum-iron blends.

The principal advantages of pre-polymerized inorganic coagulants are that they can preferably function efficiently over wide ranges of pH and raw water temperatures. They are less sensitive to low water temperatures; lower dosages are required to achieve water treatment goals; less chemical residuals are produced; and lower chloride or sulfate residuals are produced, resulting in lower final water TDS. They also produce lower metal residuals.

Pre-polymerized inorganic coagulants are prepared with varying basicity ratios, base concentrations, base addition rates, initial metal concentrations, ageing time, and ageing temperature. Because of the highly specific nature of these products, the best formulation for a particular water is case specific and preferably should be determined by jar testing. For example, in some applications alum may outperform some of the polyaluminum chloride formulations. Polymers include a large range of natural or synthetic, water soluble, macromolecular compounds having the ability to destabilize or enhance flocculation of the constituents of a body of water. To achieve favorable calcium removal, the pH should preferably be above 9.3. To achieve favorable magnesium removal, the pH should preferably be above 10. The most favorable pH range to remove calcium and magnesium it a pH above 10.5

Common pH controls include but are not limited to soda ash (sodium carbonate) and sodium hydroxide raise the pH of water to near neutral when injected into a water system. Unlike neutralizing filters, they do not cause hardness problems in treated water. Potassium hydroxide may be used as a substitute for sodium hydroxide.

Figure 5:
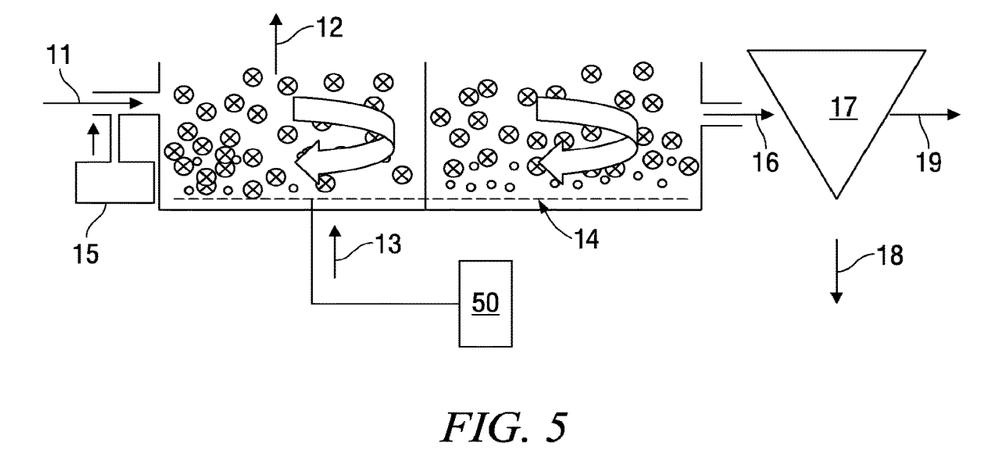
FIG. 5 is a side view of a moving bed biofilm reactor.

Acid injection can treat water with a high pH by lowering the pH of water to 7. Typically, a chemical feed pump made from corrosion-resistant materials injects a solution of acetic acid (white vinegar) into high pH water. Citric acid and alum can also be used. Weak solutions of hydrochloric acid or sulfuric acid also lower pH but these are more hazardous and require special handling. Persons skilled in the arts will recognize many coagulants and pH controls which can be used to remove calcium and magnesium molecules based on the benefit of the disclosures herein Additional challenges in lithium extraction using standard procedures include high total organic carbon content (TOC) of the water, and presence of Hydrogen sulfide, that is produced as a byproduct of microbial metabolism of organics via sulfate reduction. To overcome these setbacks, the current embodiment specifically relates to the application of a moving bed biofilm reactor (MBBR), now referring to FIG. 5, as a second step in the treatment process. The effluent from the DAF 11 is directed into the MBBR as shown in FIG. 5. In one embodiment, the MBBR utilizes polyethylene biocarriers 12 to provide surface area for supporting microbial biofilm growth, which reduces the total organic carbon content in the water through biodegradation of dissolved organics. The biocarriers are in continuous motion caused by air injection 13 from a standard air pump 50 via a sparging apparatus 14 at the bottom of the tank. Air bubbles that are generated via this process help in mechanically displacing any hydrogen sulfide gas that might be present in the water and directly inhibit activity of sulfate reducing bacteria (SRB). Furthermore, addition of a higher energy-yielding electron acceptor via a continuous chemical feed 15 causes a shift in the microbial metabolism that serves to competitively inhibit the SRBs.

Treated produced water from the MBBR 16 may then be optionally sent to a clarifier 17 for removal of additional total suspended solids (TSS) or colloidal material; the conical shape of the clarifier allows for sludge collection 18 and removal at the bottom of the unit. The resultant treated water from the clarifier 19 is then directed towards standard procedures involved in lithium extraction. Alternatively, membranes may be used to remove and TSS or colloidal material.

Figure 6:
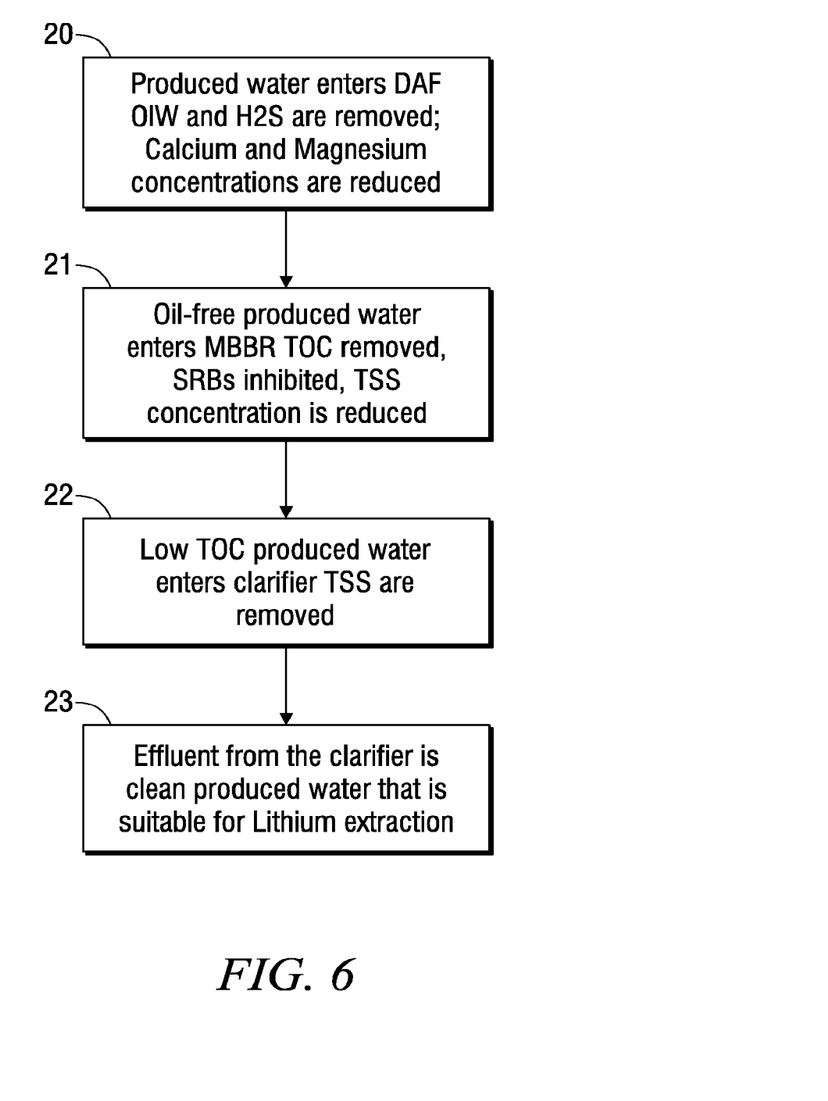
FIG. 6 is a flow-diagram of steps of a method of the present invention.

As shown in FIG. 6, in an embodiment, the present invention is a method comprised of the steps 20, 21, 22, 23 involved in lowering the concentrations of compounds that are known to interfere in extraction of metals such as, lithium. In one embodiment, produced water first enters a DAF or DGF unit wherein oil in water and hydrogen sulfur are removed. Calcium and magnesium concentrations are reduced using coagulants and pH controls 20. Produced water that is substantially oil-free enters a MBBR, wherein TOC is removed, SRBs are inhibited and TSS concentrations are reduced 21. The low TOC produced water from step 21 enters a clarifier wherein TSS are removed 22. Effluent form the clarifier in step 22, is now clean produced water that is suitable for lithium extraction. Metals, such as, lithium can undergo further concentration using thermal distillation or crystallization technology such as, U.S. Pat. No. 9,783,431. Metals such a lithium, can then be selectively removed using known solvent, microbes, chemical precipitation. Coagulant, and electrocoagulation pretreatment technology and combination thereof. Persons skilled in the art can combine the technologies with the benefit of the disclosure herein. This process allows for metal including lithium extraction in alternate sources such as produced water from oilfield operations.

Figure 7:
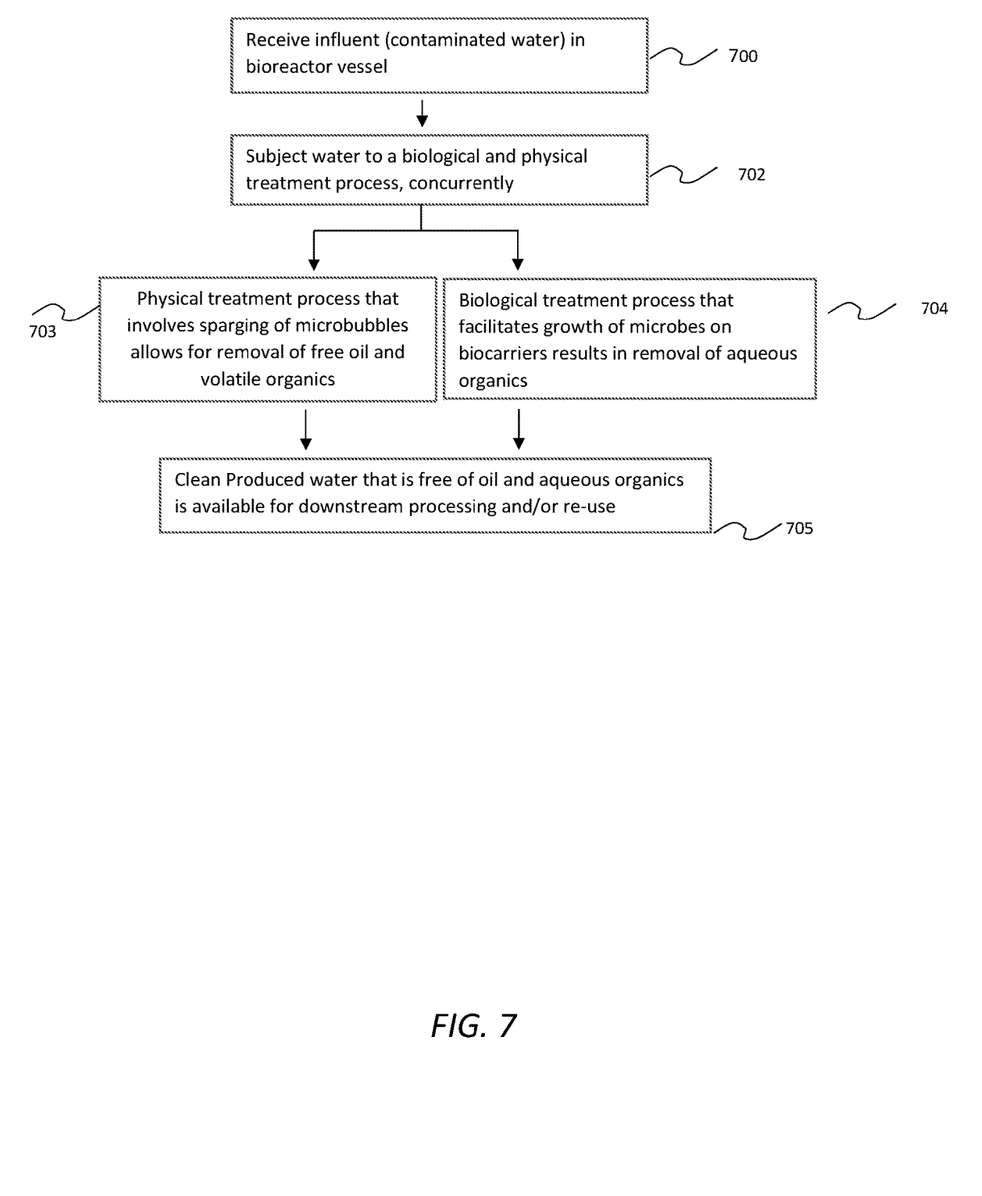
FIG. 7 is a flow-diagram of steps of a method embodiment of the present invention.

FIG. 7 details an embodiment comprised of the steps 700, 702, 703, 704 and 705, for lowering the concentrations of compounds that are known to interfere in extraction of metals such as, lithium. In Block 700 influent is received such as, contaminated produced water in a bioreactor vessel. In Block 702, the water is water is subjected to a biological and physical treatment process, concurrently. In Block 703, physical treatment process that involves sparging of microbubbles allows for removal of free oil and volatile organics. In Block 704, biological treatment process that facilitates growth of microbes on biocarriers results in removal of aqueous organics. After the physical and biological treatments, clean water is produced, as represented by Block 205. This purified water that is free of oil and aqueous organics is available for downstream processing and/or re-use. This clean water is free of oil and aqueous organics and is available for downstream processing and/or reuse.

Although the embodiments of the present disclosure and their advantages have been described in detail, various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

We claim:
1. A produced water treatment method comprising:
introducing produced water into a unit to subject the produced water to micro gas bubbles, the unit selected from the group consisting of flocculation dissolved gas floatation, dissolved air floatation, induced gas floata- tion, froth floatation and combinations thereof to remove contaminates and concentrate metals;

adding coagulants and pH control to precipitate magnesium and calcium compounds;

removing of magnesium and calcium compounds;

introducing the produced water and particular microorganisms into a second vessel of a moving bed biofilm reactor to be disposed on carriers in the second vessel;

introducing nutrients into the second vessel for the microorganisms;

concurrently subjecting produced water that includes organic materials therein, in the second vessel, to:

a biological water treatment process that removes a first set of organic materials from the produced water, wherein the biological water treatment process comprises removing the first set of organic materials by the microorganisms, the first set of organic materials comprise aqueous phase organic materials, wherein the carriers are circulating in the produced water; and a physical water treatment process that removes a second set of organic materials from the produced water.

2. The produced water treatment method of claim 1 wherein the second vessel comprises a gas floatation bioreactor vessel, wherein the carriers comprise material selected from the list consisting of: polyethylene, polyurethane, plastic, granular activated carbon, sand, ceramic, limestone, graystone, slag, and combinations thereof, and wherein the microorganisms are selected from the group consisting of: heterotrophic aerobic bacteria and archaea, heterotrophic nitrate-reducing bacteria, heterotrophic anaerobic bacteria and archaea, aerobic and anaerobic fungi, and combinations thereof and further comprising performing a thermal distillation process to concentrate metals.

3. The produced water treatment method of claim 1 wherein the physical water treatment process comprises sparging a first gas through the produced water, wherein the sparging of the first gas causes a coalescing of non-aqueous phase liquid organic materials of the second set of organic materials so that the non-aqueous phase liquid organic materials settle on a surface of the produced water, wherein the sparging of the first gas causes the circulating of the carriers and the sparging of the first gas provides oxygen to the microorganisms in the biological water treatment process, and wherein the aqueous phase organic materials and the non-aqueous phase liquid organic materials are removed concurrently from the produced water.

4. The produced water treatment method of claim 3 wherein the physical water treatment process further comprises:

skimming the non-aqueous phase liquid organic materials from a surface of the produced water.

5. The produced water treatment method of claim 1 wherein the physical water treatment process comprises sparging a first gas through the produced water, wherein the sparging of a first gas causes vapor stripping of volatile phase organic materials of the second set of organic materials so that the volatile phase organic materials move to a location above the surface of the produced water, wherein the sparging of the first gas causes the circulating of the carriers and the sparging of the first gas provides oxygen to the microorganisms in the biological treatment process, and wherein the aqueous phase organic materials and the volatile phase organic materials are removed concurrently from the produced water.

6. The produced water treatment method of claim 5 wherein the physical water treatment process further comprises:

removing the volatile phase organic materials from above a surface of the produced water;

receiving, in a third vessel, after the subjecting, the second vessel's effluent water;

subjecting the second vessel's effluent water, in a first portion of the third vessel, to a second biological water treatment process that removes a third set of organic materials from the second vessel's effluent water; flowing the first portion's effluent water to a second portion of the third vessel; and subjecting the first portion's effluent water, in the second portion of the third vessel, to a second physical water treatment process that removes a fourth set of organic materials from the first portion's effluent water; and performing a thermal distillation process to concentrate metals.

7. The produced water treatment method of claim 6 wherein the second biological water treatment process comprises:

removing the third set of organic materials by microorganisms disposed on carriers circulating in the produced water in the first portion of the third vessel.

8. The produced water treatment method of claim 7 wherein the microorganisms are selected from the group consisting of: heterotrophic aerobic bacteria and archaea, heterotrophic nitrate-reducing bacteria, heterotrophic anaerobic bacteria and archaea, aerobic and anaerobic fungi, and combinations thereof.

9. The produced water treatment method of claim 6 wherein the second physical water treatment process comprises:

sparging a second gas through the first portion's effluent water in the third vessel.

10. The produced water treatment method of claim 8 wherein the second gas is selected from the list consisting of: air, nitrogen-enriched air, nitrogen, oxygen, and combinations thereof and further comprising further comprising skimming particulate matter from a surface of the first portion's effluent water in the third vessel.

11. The produced water treatment method of claim 8 wherein the first portion of the third vessel comprises a moving bed biofilm reactor, wherein the dissolved gas floatation unit is adapted to remove particulate matter from effluent of the moving bed biofilm reactor, wherein the particulate matter includes biomass, wherein the third set of organic materials comprises aqueous phase organic materials, and wherein the fourth set of organic materials comprises biomass.

12. A produced water treatment method comprising:

introducing produced water into a first vessel of a unit to subject the produced water to micro gas bubbles, the unit selected from the group consisting of flocculation, dissolved gas floatation, dissolved air floatation, induced gas floatation, froth floatation and combinations thereof to remove contaminates and concentrate metals;

adding coagulants and pH control to precipitate magnesium and calcium compounds;

removing magnesium and calcium compounds;

introducing the produced water particular microorganisms into a second vessel of a moving bed biofilm reactor to be disposed on carriers in the second vessel;

introducing nutrients into the second vessel for the microorganisms;

concurrently subjecting produced water that includes organic materials therein, in a vessel, to:
a biological water treatment process that removes aqueous phase organic materials from the produced water using microorganisms circulating in the produced water on carriers; and
a physical water treatment process that removes non-aqueous phase liquid organic materials or volatile phase organic materials from the produced water, wherein the physical water treatment process comprises:
sparging a gas through the produced water, the sparging of the gas causing (a) a coalescing of the non-aqueous phase liquid organic materials so that the non-aqueous phase liquid organic materials settle on a surface of the produced water or (b) vapor stripping of the volatile phase organic materials so that the volatile phase organic materials move to a location above the surface of the produced water.

13. The produced water treatment method of claim 12 wherein the physical water treatment process further comprises:
skimming the non-aqueous phase liquid organic materials from a surface of the produced water or removing the volatile phase organic materials from above the surface of the produced water, wherein the gas is selected from the list consisting of: air, nitrogen-enriched air, nitrogen, oxygen, and combinations thereof; and
performing a thermal distillation process to concentrate metals.

14. A produced water treatment system comprising:
a first vessel comprising a unit to subject the produced water to micro gas bubbles, the unit selected from the group consisting of flocculation, dissolved gas floatation, dissolved air floatation, induced gas floatation, froth floatation and combinations thereof to remove contaminates and concentrate metals;
a first device for adding coagulants and pH control to precipitate magnesium and calcium compounds;
a second device for removal of magnesium and calcium compounds;
a second vessel adapted to concurrently remove organic materials from the produced water by (1) a first biological water treatment process and (2) a first physical separation process, the second vessel comprising:
a biological removal system comprising microorganisms for removing a first set of organic materials from the produced water; and
a physical separation system comprising sparging equipment for sparging the produced water to remove a second set of organic materials from the produced water.

15. The produced water treatment system of claim 14 wherein the second vessel comprises a gas floatation bioreactor vessel and the biological removal system comprises: a first set of carriers colonized by the microorganisms.

16. The produced water treatment system of claim 15 further comprising a thermal system to concentrate metals.

17. The produced water treatment system of claim 14 further comprising a thermal distillation system to concentrate metals and wherein the physical separation system comprises:
a first injector pipe for sparging a first gas through the produced water;
a compressor for delivering the first gas to the first injector pipe; and
a skimmer adapted to skim at least some of the second set of organic materials from a surface of the produced water, wherein the first gas is selected from the list consisting of: air, nitrogen-enriched air, nitrogen, oxygen, and combinations thereof, wherein the first gas comprises enough oxygen to stimulate aerobic growth of the microorganisms but not enough oxygen to cause the organic materials to ignite, wherein the first set of organic materials comprise aqueous phase organic materials, and wherein the second set of organic materials comprise a selection from the list consisting of: non-aqueous phase liquid organic materials, volatile phase organic materials, and combinations thereof.

18. The produced water treatment system of claim 17 further comprising:
a third vessel adapted to receive the second vessel's effluent water and to remove organic materials from the second vessel's effluent water by (a) a second biological water treatment process and (b) a second physical separation process, the third vessel comprising:
a second biological removal system for removing a third set of organic materials from the second vessel's effluent water; and
a second physical separation system for removing a fourth set of organic materials from the second vessel's effluent water.

19. The produced water treatment system of claim 18 wherein the second biological removal system comprises:
a second set of carriers colonized by microorganisms, wherein the microorganisms are selected from the group consisting of: heterotrophic aerobic bacteria and archaea, heterotrophic nitrate-reducing bacteria, heterotrophic anaerobic bacteria and archaea, aerobic and anaerobic fungi, and combinations thereof, wherein the second physical separation system comprises second injector pipe for sparging a second gas through the produced water, and wherein the second gas is selected from the list consisting of: air, nitrogen-enriched air, nitrogen, oxygen, and combinations thereof.

20. The produced water treatment system of claim 18 wherein the third vessel comprises inner and an outer concentric chamber, wherein the inner chamber comprises a moving bed biofilm reactor, wherein the third set of organic materials comprises aqueous phase organics, and wherein the fourth set of organic materials comprises biomass.

* * * * *